(12) United States Patent
Suphavit et al.

(10) Patent No.: US 9,616,598 B2
(45) Date of Patent: Apr. 11, 2017

(54) PLASTIC LENS MANUFACTURING METHOD

(75) Inventors: Norkaew Suphavit, Thanyaburi (TH); Jindakul Wimol, Thanyaburi (TH); Aruncharoen Thitima, Thanyaburi (TH); Wongsewattana Prasert, Thanyaburi (TH)

(73) Assignees: HOYA CORPORATION, Shinjuku-ku, Tokyo (JP); HOYA Lens Thailand Ltd., Thanyaburi, Patumthani (TH)

(*) Notice: Subject to any disclaimer, the term of this patent is extended or adjusted under 35 U.S.C. 154(b) by 459 days.

(21) Appl. No.: 13/825,730

(22) PCT Filed: Sep. 26, 2011

(86) PCT No.: PCT/JP2011/071916
§ 371 (c)(1),
(2), (4) Date: Mar. 22, 2013

(87) PCT Pub. No.: WO2012/039498
PCT Pub. Date: Mar. 29, 2012

(65) Prior Publication Data
US 2013/0187300 A1      Jul. 25, 2013

(30) Foreign Application Priority Data
Sep. 24, 2010 (JP) ................................ 2010-213621

(51) Int. Cl.
*B29D 11/00* (2006.01)
*B29C 33/00* (2006.01)
(Continued)

(52) U.S. Cl.
CPC ............ *B29C 39/40* (2013.01); *B29C 33/405* (2013.01); *B29C 39/24* (2013.01); *B29C 39/26* (2013.01);
(Continued)

(58) Field of Classification Search
CPC ........... B29L 2011/00; B29D 11/00557; B29D 11/00528; B29C 33/405; B29C 39/40
(Continued)

(56) References Cited

U.S. PATENT DOCUMENTS

| 3,337,659 A | 8/1967 | Grandperret |
| 4,095,772 A | 6/1978 | Weber |

(Continued)

FOREIGN PATENT DOCUMENTS

| EP | 0 821 642 A1 | 2/1998 |
| EP | 1 591 222 A1 | 11/2005 |

(Continued)

OTHER PUBLICATIONS

Office Action issued in corresponding Japanese Patent Application No. 2010-213621 dated Sep. 2, 2014.
(Continued)

*Primary Examiner* — Jeffrey Wollschlager
*Assistant Examiner* — Armand Melendez
(74) *Attorney, Agent, or Firm* — Sughrue Mion, PLLC

(57) ABSTRACT

An aspect or the present invention relates to a method of manufacturing a plastic lens, which comprises casting a plastic lens starting material liquid into a cavity in a forming mold and conducting a polymerization reaction of the plastic starting material liquid within the cavity to provide a molded article. The forming mold is one in which two molds are disposed opposite each other, a gasket made of an elastic resin is disposed around the two molds to form the cavity, and at least one of the two molds is made of an elastic resin, one surface of the molded article is a convex surface and the other surface of the molded article is a concave surface, and the concave surface is formed by transferring a molding surface of the mold made of elastic resin.

6 Claims, 1 Drawing Sheet

(51) Int. Cl.
B29C 39/02 (2006.01)
B29C 39/40 (2006.01)
B29C 39/24 (2006.01)
B29C 39/26 (2006.01)
B29C 33/40 (2006.01)
B29C 39/00 (2006.01)
B29L 11/00 (2006.01)

(52) U.S. Cl.
CPC .. *B29D 11/00528* (2013.01); *B29D 11/00557* (2013.01); *B29C 39/00* (2013.01); *B29L 2011/00* (2013.01)

(58) Field of Classification Search
USPC .................................................. 264/1.32, 2.2
See application file for complete search history.

(56) References Cited

U.S. PATENT DOCUMENTS

| | | | | |
|---|---|---|---|---|
| 2004/0041287 | A1* | 3/2004 | Engardio | ............. B29C 39/006 264/1.7 |
| 2008/0001319 | A1 | 1/2008 | Kadowaki | |
| 2009/0224417 | A1* | 9/2009 | Lawton | ................ B29C 33/308 264/2.5 |

FOREIGN PATENT DOCUMENTS

| | | | |
|---|---|---|---|
| JP | 09-300371 A | 11/1997 | |
| JP | 09300371 | * 11/1997 | ............. B29C 39/26 |
| JP | 2004216673 A | 8/2004 | |
| JP | 200830431 A | 2/2008 | |
| JP | 200868412 A | 3/2008 | |
| JP | 2009234111 A | 10/2009 | |
| WO | 2005042221 A1 | 5/2005 | |
| WO | WO2005042221 | * 5/2005 | ....... B29D 11/00413 |

OTHER PUBLICATIONS

International Search Report corresponding to International Patent Application No. PCT/JP2011/071916, dated Dec. 13, 2011.
International Preliminary Report on Patentability corresponding to International Patent Application No. PCT/JP2011/071916, dated Mar. 26, 2013.
Communication dated Nov. 15, 2016 from the European Patent Office in counterpart Application No. 11826940.6.

* cited by examiner

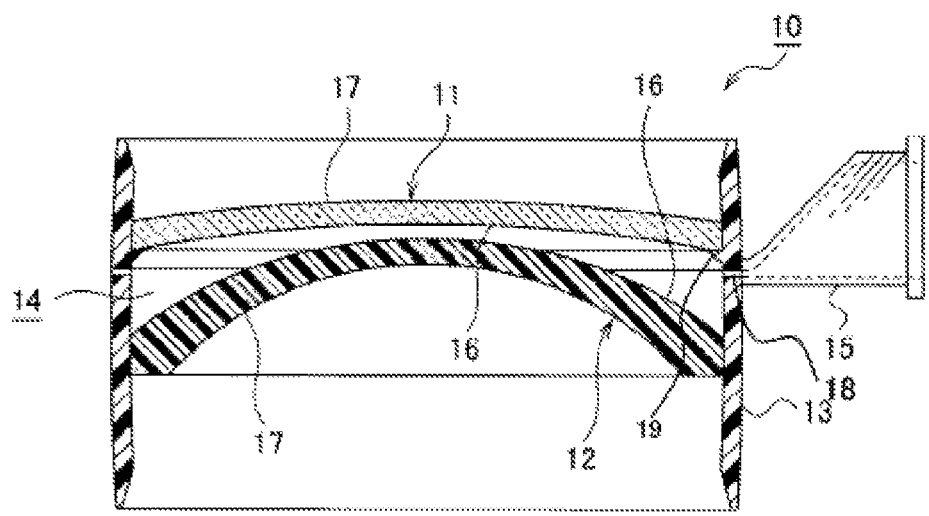

PLASTIC LENS MANUFACTURING METHOD

CROSS REFERENCE TO RELATED APPLICATIONS

This application is a National Stage of International Application No. PCT/JP2011/071916, filed on Sep. 26, 2011, which claims priority from Japanese Patent Application No. 2010-213621, filed on Sep. 24, 2010, the contents of all of which are incorporated herein by reference in their entirety.

TECHNICAL FIELD

The present invention relates to a method of manufacturing a plastic lens, and more particularly, to a method of manufacturing a plastic lens that can inhibit the generation of defects accompanying polymerization shrinkage in the course of manufacturing a plastic lens by cast polymerization.

BACKGROUND ART

Cast polymerization methods of polymerizing a plastic lens starting material liquid in a forming mold are widely employed as methods of obtaining plastic lenses by molding plastic into lens shapes. There is one known method of cast polymerization in which two molds (an upper mold and a lower mold) are inserted into an annular gasket and a plastic starting material liquid is cast into the cavity (space) formed by the gasket and the upper and lower molds and polymerized (for example, see Reference 1 (Japanese Unexamined Patent Publication (KOKAI) No. 2008-30431) and Reference 2 (Japanese Unexamined Patent Publication (KOKAI) No. 2009-234111). In east polymerization methods, the shape of the molding surfaces of the molds is transferred to form the shape of the lens surfaces.

SUMMARY OF THE INVENTION

The generation of shape defects and bubble defects occurred when bubbles enter the cavity, accompanying polymerization shrinkage, is known to occur in the course of polymerizing a starting material liquid within the cavity in cast polymerization (for example, see above-cited Reference 2). The generation of these defects relates to decreased productivity due to a rise in the defect rate and to an increase in the amount of waste accompanying the elimination of defective portions (and thus an increase in the environmental burden and in cost). Accordingly, there is a need to provide a method of manufacturing a plastic lens that does not generate the above defects accompanying polymerization shrinkage.

In the light of the above circumstances, the present invention was devised with the object of providing a method of manufacturing a plastic lens that can inhibit the generation of various defects accompanying polymerization shrinkage in the course of manufacturing a plastic lens by east polymerization.

The present inventors conducted extensive research into achieving the above-stated object, resulting in the following discovery.

The forming mold that is employed in conventional cast polymerization will be described first based on FIG. 1.

The forming mold 10 shown in FIG. 1 comprises a mold (upper mold) 11 in the form of a concave mold having a molding surface on the concave surface side thereof for forming the front (convex surface) of a lens, and a mold (lower mold) 12 having a molding surface on the convex surface side thereof for molding the rear surface (concave surface) of a lens. An annular gasket 13 encloses the circumferential surfaces of the two molds, thereby forming a cavity 14 on the interior. The upper mold and the lower mold are comprised of non-transfer surfaces (non-utilized surfaces 17) that can be handled with a manufacturing jig, and transfer surfaces (utilized surfaces 16) for transferring the surface shape to the molded article within the cavity. In the forming mold, a plastic lens starting material liquid that is cast through a casting inlet 15 is guided into cavity 14 through a casting opening 18 formed on the lateral surface of gasket 13, and undergoes a polymerization reaction within cavity 14. Generally, a forming mold of such a structure is assembled such that two glass molds having an outer diameter slightly larger than the opening diameter of a gasket comprised of an elastic member screw into openings in the gasket. The airtight seal within the cavity is maintained by the force with which the gasket holds the molds together.

When polymerization shrinkage occurs within the cavity in this forming mold, the only member that deforms with polymerization shrinkage is the gasket comprised of elastic resin. The molds made of glass do not undergo changes of a degree that would affect the shape. The gasket deforms to the inside of the cavity in a manner that tracks the polymerization shrinkage. As an opposed action thereof, a force tending to push the molds outward is exerted at the edge holding the molds, so the force holding the molds together is lessened. As a result, a slight gap forms between the inner circumferential surface of the gasket and the outer circumferential surface of the mold, which has been presumed by the present inventors to be the cause of bubble defects. Based on investigation by the present inventors, in a forming mold for molding a lens with a convex front surface and a concave rear surface such as that shown in FIG. 1, a phenomenon was observed whereby the above-described bubble defects occurred markedly on the concave surface side. This was attributed to the effect of lessening of the force holding the molds together occurring in pronounced fashion on the lower mold side for reasons of shape.

Further, as an example of a shape defect accompanying polymerization shrinkage, the center portion of the edge surface became concave to the inside of the rim portion (producing a constriction) on the outer circumference side of the surface (edge surface) of the molded article that had been released from the forming mold. To obtain a finished lens, it became necessary to cut away the constriction. The portion that was cut away ended up increasing relative to when no constriction was present. Accordingly, the quantity of waste increased by that amount, thus increasing the environmental burden and cost. In this regard, the present inventors surmised that when the force pushing the forming molds toward the interior of the cavity was exerted on just the gasket and caused it to deform, the amount of deformation of the gasket was necessarily great, and transfer of the shape of the highly deformed gasket resulted in a molded article that ended up having a constriction on the lateral outer circumferential surface (edge surface) thereof.

Based on the above knowledge, the present inventors conducted further extensive research. As a result, they discovered that in a forming mold of the above configuration, by forming at least the lower mold out of the same elastic resin as the gasket, it was possible to prevent bubble defects and shape defects constriction of the edge surface).

This was presumed to occur because the lower mold also deformed in polymerization shrinkage, thereby inhibiting the formation of a gap between the inner circumferential surface of the gasket and the outer circumferential surface of the lower mold. Because the lower mold also deformed with the gasket, the amount of deformation of the gasket was reduced and generation of the above-described constriction was inhibited.

The present invention was devised based on this information.

An aspect of the present invention relates to:

a method of manufacturing a plastic lens, which comprises:

casting a plastic lens starting material liquid into a cavity in a forming mold and conducting a polymerization reaction of the plastic starting material liquid within the cavity to provide a molded article, wherein the forming mold is one in which two molds are disposed opposite each other, a gasket made of an elastic resin is disposed around the two molds to form the cavity, and at least one of the two molds is made of an elastic resin, one surface of the molded article is a convex surface and the other surface of the molded article is a concave surface, and the method comprises forming the concave surface by transferring a molding surface of the mold made of elastic resin.

The mold made of an elastic resin can be made of a resin of greater elasticity than the elastic resin making the gasket.

The mold made of an elastic resin can be made of the same elastic resin as the elastic resin making the gasket.

One of the two molds can be a mold made of glass and the other can be a mold made of an elastic resin.

The gasket can have a protruding band on the inner circumferential surface, and in the forming mold, the protruding band can come into contact with the perimeter portion of the molding surface of the mold made of glass to hold the mold made of glass in position.

The present invention can provide a high-quality plastic eyeglass lens with high productivity without increasing the environmental burden.

BRIEF DESCRIPTION OF DRAWINGS

FIG. 1 is a descriptive drawing (sectional view) of a forming mold.

MODES FOR CARRYING OUT THE INVENTION

The present invention relates to a method of manufacturing a plastic lens comprising casting a plastic lens starting material liquid into a cavity in a forming mold and conducting a polymerization reaction of the plastic starting material liquid within the cavity to provide a molded article. The forming mold that is employed in the method of manufacturing a plastic lens of the present invention is one in which two molds are disposed opposite each other, a gasket made of an elastic resin is disposed around the two molds to form the above cavity, and at least one of the two molds is made of an elastic resin. In the present invention as set forth above, in the course of molding a molded article one surface of which is a convex surface and the other surface of which is a concave surface, the forming mold is disposed for use such that the mold made of elastic resin is the lower mold. That is, the concave surface is formed by transferring the molding surface of the mold made of elastic resin, thereby preventing the generation of bubble defects and shape defects accompanying polymerization shrinkage.

The present invention will be described in greater detail below.

The configuration of the forming mold that is employed in the present invention is identical to that of the forming mold employed in common cast polymerization shown in FIG. 1. It is comprised of an upper mold in the form of a concave mold having a molding surface on the concave side thereof for forming the convex surface of a molded article in a cavity, a lower mold having a molding surface on the convex side thereof for molding a concave surface, and a gasket surrounding the upper mold and lower mold. Details on the forming mold are as set forth with regard to FIG. 1 above. In the present invention, at least the lower mold and gasket of the forming mold are formed of elastic resin.

Thermoplastic resins that are commonly employed to manufacture gaskets can be employed as the elastic resin constituting the lower mold and the gasket. Such resins can be molded by known molding methods such as injection molding to obtain the lower mold and gasket made of elastic resin. The thermoplastic resin is desirably an olefin resin and preferably a polyethylene elastomer from the perspective of moldability, flexibility, heat resistance, monomer stability, and cost. Specific examples of olefin elastomers are polyethylene elastomers comprised of low-density polyethylene, polypropylene elastomers in which a rubber component is finely dispersed in a polypropylene homopolymer, ethylene-vinyl acetate copolymers, and ethylene-alkyl acrylate copolymers. Additionally, various elastic resins that are classified as elastomers can be employed.

The casting opening for casting the plastic lens starting material liquid into the cavity that is provided on the lateral surface of the gasket can be formed during molding such as injection molding, or can be formed by opening a hole in the lateral surface by a known hole-forming means such as a cutter or drill after molding. As indicated in FIG. 1, providing a flannel-shaped casting inlet connecting to the casting opening is desirable to facilitate guiding the plastic lens starting material liquid. The casting inlet can be formed during molding such as injection molding, or can be molded as a separate member and mounted with an adhesive or the like.

In one embodiment, the lens-shaped molded article that is obtained by cast polymerization in the present invention is a finished lens both surfaces of which have been optically finished (a lens blank both surfaces of which have been optically finished). In another embodiment, it is a semifinished lens with one surface that is an optical surface and another surface that is a non-optical surface (a lens blank with just one optically finished surface). In a semifinished lens, the front surface is an optically finished surface and the rear suffice is polished to the desired lens configuration based on the lens prescription values.

When employing a mold made of an elastic resin to form an optical surface, the mold made of an elastic resin can be molded with a metal mold in which the surface that is transferred to the molding surface of the mold has been mirror polished, thereby yielding a mold having a molding surface that can form an optical surface. Employing such a mold makes it possible to employ the surface to which has been transferred the shape of the molding surface of the mold as the optical surface of a lens as is, without polishing or the like. However, in the present invention as set forth above, the generation of various defects is prevented by dispersing the deformation that accompanies polymerization shrinkage to the mold and not concentrating it in the gasket.

Thus, the mold will necessarily also undergo deformation during the polymerization reaction. Accordingly, when an optical surface is formed from a mold of elastic resin, it is desirable to take into account deformation of the mold of elastic resin and to conduct preliminary testing as needed to determine the amount of deformation of the mold of elastic resin in the polymerization reaction, on the basis of which the shape of the molding surface of the mold is then designed. From the perspective of facilitating mold design, the mold for forming the optical surface is desirably one that is made of glass that does not undergo deformation due to polymerization shrinkage. Accordingly, from this perspective, the present invention is desirably applied to the manufacturing of a semifinished lens in which the convex side is the optical surface and the concave side is the non-optical surface, the optical surface (convex surface) is formed with a mold of glass, and the non-optical surface (concave surface) is formed with a mold of elastic resin. Having the mold of glass that forms the optical surface be correctly held in position within the forming mold is desirable from the perspective of increasing surface precision. Thus, it is desirable to provide a protruding band on the inner circumferential surface of the gasket such that the protruding band comes in contact with the rim portion of the molding surface of the mold of glass, thereby correctly holding the mold of glass in position within the forming mold. However, the thickness of the molded article that can be obtained by cast polymerization is determined by the gap between the upper and lower molds within the forming mold. Thus, when a protruding band that holds the two molds in position is provided on the inner circumferential surface of the gasket, it becomes necessary to prepare molds for each desired thickness. This is undesirable from the perspective of manufacturing cost and productivity. Accordingly, providing a protruding band only on the glass mold side of the gasket and not providing a protruding band on the elastic resin mold side of the gasket are desirable from the perspective of reducing manufacturing costs and raising productivity. In that case, the mold of glass can be brought into contact with the protruding band on the inner circumferential surface of the gasket and the mold of elastic resin can be pressed to a prescribed position in the opening in the gasket to assemble a forming mold corresponding to the desired thickness. The forming mold shown in FIG. 1 is a forming mold of such a configuration; a protruding band 19 is provided completely around the inner circumferential surface of the gasket only on the upper mold side. Normally, in such a configuration, the mold that is not held in position by the protruding band of the gasket tends to be affected by the above-described polymerization shrinkage of the gasket. However, in the present invention, this mold is made of an elastic resin, thereby reducing that effect. In the present invention, the mold of glass that is employed can be any mold that is commonly employed in cast polymerization, without limitation. The mold of elastic resin can be constituted the same as any mold employed in common cast polymerization with the exception that it be formed of an elastic resin. In the same manner as in common cast polymerization, the configuration can be one in which the upper mold and lower mold have an outer diameter that is slightly larger than the diameter of the opening of the gasket employed, with the airtight seal of the gasket being ensured by the farce of the gasket holding the molds together.

The elastic resin that is used to manufacture the gasket and the elastic resin that is used to manufacture the lower mold can be one and the same, or can be different. Shape defects caused by polymerization shrinkage (the above-described edge surface constriction) are due to gasket deformation. Thus, to effectively prevent the occurrence of shape defects, it is desirable to ensure that most of the deformation accompanying polymerization shrinkage is not borne by the gasket. When this point is considered, the mold of elastic resin is desirable formed of an elastic resin with a modulus of elasticity that is greater than or equal to that of the elastic resin constituting the gasket. For that reason, the tower mold and the gasket are desirably either fabricated out of the same elastic resin or the lower mold is fabricated out of a resin with a higher elasticity than the gasket.

In the same manner as in common cast polymerization, the forming mold in the present invention can be assembled by inserting the two molds into the gasket opening. The gap between the two molds determines the thickness of the molded article obtained. The plastic lens starting material liquid (also referred to as the "lens starting material liquid" hereinafter) that is east into the cavity of the forming mold thus formed contains polymerizable components. It can contain the starting material monomers, oligomers, and/or prepolymers of various polymers constituting the plastic lens substrate of a common eyeglass lens, or can contain a mixture of two or more monomers for forming a copolymer. The polymerizable components can be thermopolymerizable components or photopolymerizable components. In cast polymerization, thermopolymerizable components are normally employed in the lens starting material liquid, a catalyst that is selected based on the type of monomer can be added as needed. The lens starting material liquid can also contain various additives that are commonly employed.

Specific examples of the polymerizable lens starting material liquid are copolymers of methyl methacrylate and one or more other monomers, diethylene glycol bisallyl carbonate resin (CR-39), copolymers of diethylene glycol bisallyl carbonate and one or more additional monomers, copolymers of polyurethane and polyurea, polycarbonate, polystyrene, polyvinyl chloride, unsaturated polyester, polyethylene terephthalate, polyurethane, polythiourethane, sulfide resins utilizing ene-thiol reactions, and sulfur-containing vinyl copolymers. The starting material liquid can be cast into the cavity for plastic lens starting material casting over the above-described passage.

Next, the lens starting material liquid that has been cast into the cavity is subjected to heat, irradiated with light, or the like to conduct a polymerization reaction (curing reaction) of the polymerizable components contained in the lens starting material liquid and obtain a lens-shaped molded article. The polymerization reaction conditions (such as the temperature-raising heating program) are not specifically limited and can be determined based on the type glens starting material liquid employed. Following completion of the polymerization reaction, the two molds that are tightly adhered to the lens are separated (the molds are released) and the gasket is removed to permit removal of the lens-shaped molded article. As set forth above, the molded article thus obtained can be a finished lens or a semifinished lens. The non-optical surface of a semifinished lens can be polished based on lens prescription values to finish the optical surfaces.

Subsequently, the plastic lens the two optical surfaces of which have been optically finished are edge processed to the shape of an eyeglass frame and beveled by an optician or a manufacturer who has received an order from an optician. Prior to or following the above process, functional films for imparting desired properties, such as antireflective films and water-repellent films, can be formed on the lens by known methods as needed. Lenses that have been edge processed and on which functional films have been formed as needed are inserted into an eyeglass frame to complete a pair of eyeglasses. When constrictions have formed on the edge surface of the molded article that is removed from the forming lens as set forth above, the portion that must be removed to render the shape of the edge surface uniform increases. As a result, the quantity of waste increases (increasing the burden on the environment) and the effective diameter of the tens decreases (increasing cost). Since the present invention can inhibit the generation of constrictions on the edge surface, it can reduce the discarded portion that must be removed to render the edge surface uniform and can inhibit an increase in cost and the burden on the environment. The present invention can further inhibit the generation of bubble defects, thereby permitting the stable mass production of optically homogeneous eyeglass lenses,

EXAMPLES

The present invention will be described in detail below based on Examples. However, the present invention is not limited to the embodiments shown in Examples.

Example 1

(1) Fabrication of the forming mold
The forming mold the sectional view of which is shown in FIG. 1 was fabricated by the following method,
Gasket 13 was fabricated by injection molding an ethylene elastomer (Excellen VL made by Sumitomo Chemical). A cutter was used to form a casting opening in the lateral surface of the gasket That had been fabricated, after which a casting inlet that had been separately molded by injection molding was adhered with adhesive to the lateral surface of the gasket such that the opening of the casting inlet was lined up with the casting opening on the lateral surface of the gasket.
A mold of soda glass was prepared as upper mold 11.
Lower mold 12 was fabricated by injection molding the same ethylene elastomer as that of the gasket (Excellen made by Sumitomo Chemical).
The upper mold and lower mold were inserted into the opening of the gasket, which was slightly smaller in diameter than the outer diameter of the molds, to assemble the forming mold.
(2) Fabrication of a molded article
The forming mold obtained in (1) above was disposed with the casting inlet thereof facing vertically upward. Subsequently, a starting material liquid of diethylene glycol bisallyl carbonate resin (CR-39) was cast through the casting inlet into the cavity 14 in the forming mold. Once the cavity had been filled with the starting material liquid, a polymerization reaction was conducted according to a prescribed thermopolymerization program. When the polymerization reaction had ended, the lens-shaped molded article was removed from the forming mold.
With the exception that the lower mold was fabricated by injection molding an olefin elastomer resin (Santoprene, made by Exxon Mobil Corporation) that was of greater elasticity than the ethylene elastomer employed to fabricate the gasket, a lens-shaped molded article was obtained by the same method as in Example 1.

Comparative Example 1

With the exception that a mold made of the same soda glass as the upper mold was used as the lower mold, a lens-shaped molded article was obtained by the same method as in Example 1.

Evaluation Methods and Evaluation Results
(1) Presence or absence of shape defects (edge surface constrictions)
The phenomenon whereby the center portion of the lateral surface of the gasket turns toward the cavity side during the polymerization reaction was confirmed in Comparative Example 1. The molded article obtained exhibited a constriction on the edge surface because the indentation on the gasket lateral surface was transferred (the shape of the center portion of the edge surface was depressed to the inside of the rim portion).
By contrast, the above phenomenon was not observed in Examples 1 and 2, and the edge surfaces of the molded articles obtained were uniform and did not exhibit constrictions.
(2) Presence or absence of bubble defects
The external appearance of the molded articles obtained in Examples 1 and 2 and Comparative Example 1 was inspected to determine whether or not bubbles had been generated in the molded articles to a visible degree. As a result, the presence of bubbles was not found in Examples 1 and 2. By contrast, the generation of numerous bubbles was found primarily on the concave side (lower mold side) in Comparative Example 1. This was attributed to deformation of the gasket due to polymerization shrinkage, compromising the seal between the outer circumference surface of the lower mold and the inner circumferential surface of the gasket that resulted in numerous bubbles mixing into the starting material liquid in the cavity from the lower mold side.
The above results indicate that the present invention can effectively inhibit the generation of shape defects and bubble defects due to polymerization shrinkage.
The present invention is useful in the field of manufacturing eyeglass lenses.
The invention claimed is:
1. A method of manufacturing a plastic lens, which comprises:
casting a plastic lens starting material liquid into a cavity in a forming mold and conducting a polymerization reaction of the plastic starting material liquid within the cavity to provide a molded article, wherein
the forming mold is one in which two molds are disposed opposite each other, a gasket made of an elastic resin is disposed around the two molds to form the cavity, said two molds and said gasket each being a separate structure from the other structures, and at least one of the two molds is made of an elastic resin,
one surface of the molded article is a convex surface and the other surface of the molded article is a concave surface, and
the method comprises forming the concave surface by transferring a molding surface of the mold made of elastic resin,
wherein among the two molds, one is a mold made of glass and the other is a mold made of elastic resin,
wherein the gasket has a protruding band on an inner circumferential surface thereof,
wherein in the forming mold, the protruding band comes into contact with a perimeter portion of the molding surface of the mold made of glass to hold the mold made of glass in position,
wherein the protruding band is provided only on the glass mold side of the gasket and not provided on the elastic resin mold side of the gasket;
wherein the molded article is a semifinished lens with one surface that is an optical surface in the form of a convex surface and another surface that is a non-optical surface in the form of a concave surface, and wherein the elastic resin is olefin resin.

2. The method of manufacturing a plastic lens according to claim 1, wherein the mold made of elastic resin is made of a resin having a higher elasticity than the elastic resin making the gasket.

3. The method of manufacturing a plastic lens according to claim 1, wherein the mold made of elastic resin is made of the same resin as the elastic resin making the gasket.

4. The method of manufacturing a plastic lens according to claim 2, wherein the gasket has a protruding band on an inner circumferential surface thereof, and in the forming mold, the protruding band comes into contact with a perimeter portion of the molding surface of the mold made of glass to hold the mold made of glass in position.

5. The method of manufacturing a plastic lens according to claim 3, wherein the gasket has a protruding band on an inner circumferential surface thereof, and in the forming mold, the protruding band comes into contact with a perimeter portion of the molding surface of the mold made of glass to hold the mold made of glass in position.

6. The method of manufacturing a plastic lens according to claim 1, wherein the optical surface in the form of a convex surface is formed by transferring a molding surface of the mold made of glass and the non-optical surface in the form of a concave surface is formed by transferring a molding surface of the mold made of elastic resin.

* * * * *